United States Patent

Pickett

[11] 3,970,069
[45] July 20, 1976

[54] SOLAR HEATER/COOLER ASSEMBLY

[76] Inventor: John Pickett, 1232 Zacchini Ave., Sarasota, Fla. 33577

[22] Filed: Feb. 24, 1975

[21] Appl. No.: 552,286

[52] U.S. Cl. .............................................. 126/271
[51] Int. Cl.² ............................................ F24J 3/02
[58] Field of Search .................. 126/270, 271; 62/2; 237/1 A

[56] References Cited
UNITED STATES PATENTS

| | | | |
|---|---|---|---|
| 2,396,338 | 3/1946 | Newton | 126/271 |
| 2,544,474 | 3/1951 | Swanton, Jr. | 126/271 |
| 3,250,269 | 5/1966 | Sherock | 126/271 |
| 3,299,881 | 1/1967 | Koch | 126/271 |
| 3,815,574 | 6/1974 | Gaydos | 126/271 |

Primary Examiner—Kenneth W. Sprague
Assistant Examiner—James C. Yeung
Attorney, Agent, or Firm—Duckworth, Hobby, Orman, Allen & Pettis

[57] ABSTRACT

A solar heater/cooler assembly designed primarily for use with swimming pools with a pumping system and including heat exchanger coils and automatic temperature control to regulate the operation of the solar heater/cooler.

4 Claims, 2 Drawing Figures

SOLAR HEATER/COOLER ASSEMBLY

BACKGROUND OF THE INVENTION

1. Field of the Invention

A solar water heater assembly designed to be primarily used with swimming pools and including an automatic temperature control to regulate the function of the heater.

2. Description of the Prior Art

There are many types of solar heaters available in the prior art, but many of these are unnecessarily complex and normally are designed for specific applications. Typically, a great number of presently commercially available solar heaters are designed to achieve relatively high temperatures for use in residential or industrial hot water heaters or environment heaters. These prior art solar heaters designed to achieve relatively high temperatures are usually insulated and protected by container devices with transparent portions in order to efficiently maintain their high temperatures. This is unnecessary for a heater designed to raise the temperature of a large body of fluid only a few degrees. These prior art "high temperature" heaters are generally considered to be overly complex for applications such as swimming pools.

Generally, prior art solar heaters have either no temperature sensing devices or a temperature sensing device which is dependent only upon the output fluid temperature. As set forth above, the temperature range of the output liquid is the prime consideration of residential type water heaters. This situation is inadequate for a solar pool heating device because manual intervention is inefficient and for a pool heater, relative temperatures between the input and the output of the heater are important factors.

Therefore, a need exists for a solar heater adaptable for use with relatively large bodies of liquid which is easy to install, requires little or no maintenance, is of simple design and accordingly is inexpensive to construct. Such a heater should also be capable of automatic operation wherein activation of the device is dependent upon a predetermined temperature differential between the incoming and outgoing liquid of the heater to and from the body of water being treated.

SUMMARY OF THE INVENTION

The present invention is directed to a solar heater designed primarily to be used with large bodies of water such as swimming pools wherein it is desired to raise the temperature of a large body of liquid a few degrees above the ambient temperature. A large volume of liquid flows through the heater coils and is raised in temperature a relatively small increment generally in the range of 10° to 25° F. This liquid flows back to the reservoir causing a small increase in temperature. As more liquid is circulated, the reservoir temperature increases above ambient temperature. There is heat lost to the atmosphere from the reservoir even as heat is added by the liquid from the heater. Equilibrium is attained when the heat losses within the system are equal to the heat gain. Where there is no heat gain by the heater, the liquid flow is terminated to prevent loss in the heater.

Accordingly, the subject solar heater comprises a solar heater structure in combination with a swimming pool pump and filtering system of substantially conventional design. More specifically the heater structure comprises a heat exchanger coil with inlet and outlet pipes or conduits branching from the swimming pool pump/filtering system inlet pipe to the swimming pool. A plurality of fluid regulating valves are placed throughout the system and specifically in the inlet line to the heat exchanger and between the inlet and outlet interconnects to the line from the pool's pump to the pool. Check valve means regulate the direction of fluid flow in the desired direction disposed in the path of fluid flow in the inlet line or conduit. Sensor means comprise temperature sensors located at predetermined pockets along the fluid path on the inlet pipe and on the outlet pipe to and from the heat exchanger portion of the heater, respectively. There is a cross connect pipe between the inlet and outlet pipes and located therein is a control valve means. This valve means is connected to a temperature differential sensing means. The differential sensing unit is electrically or mechanically interconnected to the control valve and is capable of regulating the position of the control valve in an open or closed position dependent upon the temperature of the outlet fluid. When the outlet fluid temperature is substantially equal to the temperature of the inlet fluid, the control valve is shut down. By reversing the temperature sensors, the system can operate to cool the fluid rather than heat it. That is, when the temperature of the inlet fluid exceeds the temperatures of the outlet fluid, the control valve can be opened. This would be for use in the summer when it possibly would be desirable in certain southern locations to cool the fluid.

As set forth above, the heat exchanger portion of the solar heater comprises a coil means of predetermined configuration to accomplish maximum exposure to solar radiation. The coil means is constructed from the thin walled plastic tubing. The coil, more specifically includes a plurality of tubing sections substantially linear in shape and coupled together with U-shaped sections to accomplish the overall "serpentine" configuration of the tube. All of the tubing sections and connectors are constructed of plastic material designed to resist deteriorating effects of the sun and yet to absorb substantial amounts of radiation. The tubing plastic is preferably black in color to accomplish maximum absorption of solar radiation.

The concept of the swimming pool solar heater is to raise the temperature of a large quantity of fluid. To achieve this it is anticipated that the heat exchanger portion of the heater, comprising the tubing sections, define a relatively lengthening path of fluid flow. Accordingly, a substantial length of tubing will be used. In order to more efficiently use the space available for locating the heat exchanger, one or more layers of tubing may be superimposed upon one another and arranged in a "serpentine" or like configuration.

One embodiment of the present invention comprises the elimination of the temperature differential sensing control valve. This also eliminates the need for the cross connect tubing and essentially puts the system on manual operation. Alternately, the system is regulated by the time clock connected to the pool filtering system.

The invention accordingly comprises the features of construction, combination of elements and arrangement of parts which will be exemplified in the construction hereinafter set forth, and the scope of the invention will be indicated in the claims.

BRIEF DESCRIPTION OF THE DRAWINGS

For a fuller understanding of the nature and objects of the invention, reference should be had to the following detailed description taken in connection with the accompanying drawings in which.

Similar reference characters refer to similar parts throughout the several views of the drawings.

DETAILED DESCRIPTION

Figure 1:
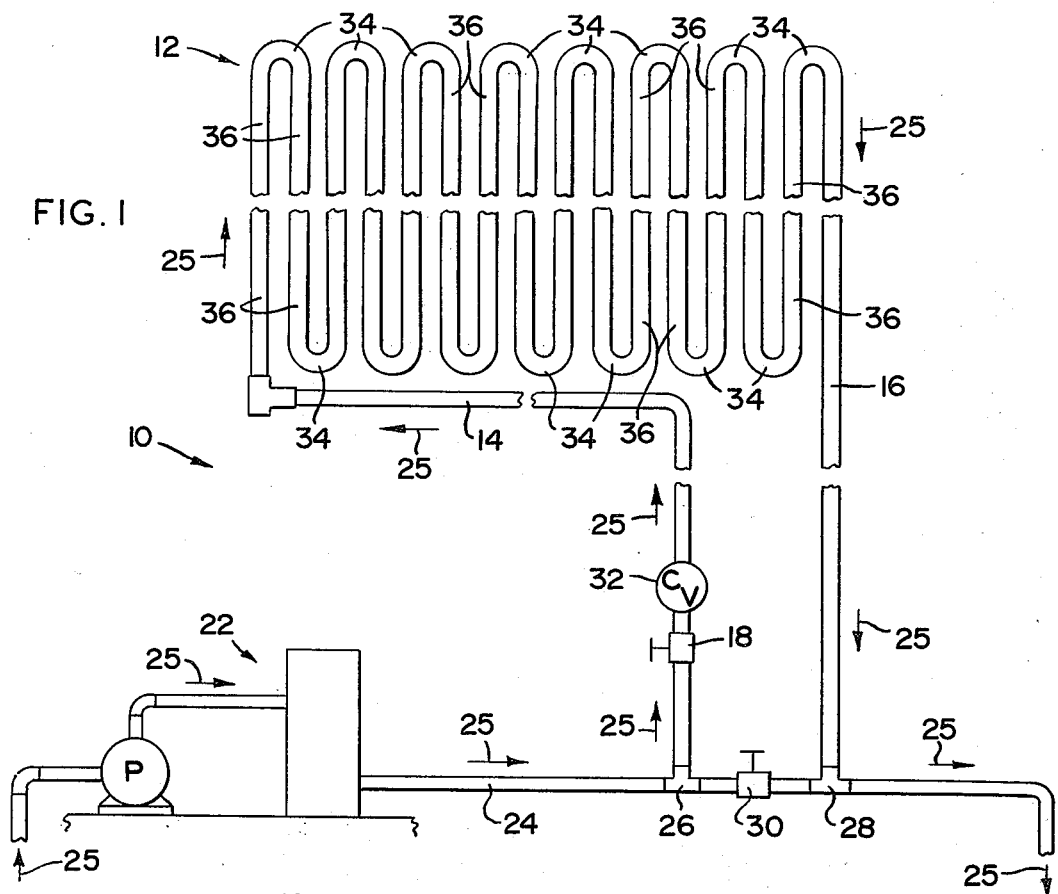
FIG. 1 is a schematic view of a manually controlled embodiment of the subject swimming pool solar heater invention.

The solar heater of the present invention is indicated in the figures generally as 10. Heat exchanger means is indicated generally as 12 and is connected in fluid communication with the liquid reservoir as shown. The pool pump/filter system is generally indicated as 22 and can be of conventional design. Accordingly, the filter system and pump does not comprise a part of the present invention per se. Conduit means 24 passes from pool pump/filter system to the swimming pool, not shown in the drawings.

In conduit means 24 are located first and second connector means 26 and 28 which, in the embodiment shown comprises T-shaped conduits. Obviously, any other applicable configuration can be utilized. First connector means 26 branches off of conduit means 24 and into inlet conduit means 14. Second connector means 28 branches off of conduit means 24 downstream from first connector means 26 and into outlet conduit means 16. Fluid flow through the entire system is indicated by directional flow arrows 25. Inlet conduit means 14 passes from first connector means 26 to heat exchanger means 12. Outlet conduit means 16 passes from heat exchanger means 12 to second connector means 28.

Heat exchanger means 12 comprises substantially linear tube sections 36 connected to one another by U-shaped tube means 34. In the preferred embodiment, heat exchanger means 12 comprises multiple coils of tubing in a serpentine configuration. However, any configuration of substantially hollow tubing interconnected to generate sufficient exposure to solar radiation is acceptable.

The tubing of heat exchanger means 12 comprises substantially thin walled plastic tubing. This plastic tubing is of such a type as to be substantially resistant to the deteriorating effects of solar radiation and yet capable of absorbing substantial amounts of solar radiation. In the preferred embodiment this is a specially extruded ABS plastic.

Located in inlet conduit means 14 is first valve means 18. In the preferred embodiment, valve means 18 is manually operated. However, any type of valve which would prevent fluid flow into heat exchanger means 12 would be suitable. Also located in inlet conduit means 14 is check valve means 32. Check valve means 32 prevents the reverse flow of fluid through heat exchanger means 12.

In conduit means 24 is located first and second valve means 30. Second valve means 30 is substantially located between connector means 26 and 28 and serves to induce fluid flow through heat exchanger means 12. FIG. 2 depicts the solar swimming pool heater with the temperature differential sensing means. The swimming pool heater depicted in FIG. 2 is substantially the same as that depicted in FIG. 1 with the following modifications. Between inlet conduit means 14 and outlet conduit means 16 is located cross conduit means 38. Cross conduit means 38 is constructed of substantially the same material as inlet conduit means 14 and outlet conduit means 16. Control valve means 46 is located at least partially within cross conduit means 38.

In the preferred embodiment (FIG. 2) temperature differential sensing means comprises temperature sensing means 40 and 42 located on inlet conduit means 14 and outlet conduit means 16 respectively. The temperature as determined by temperature sensing means 40 and 42 is compared in temperature difference sensing means 44 which then controls automatic valve means 46.

Figure 2:
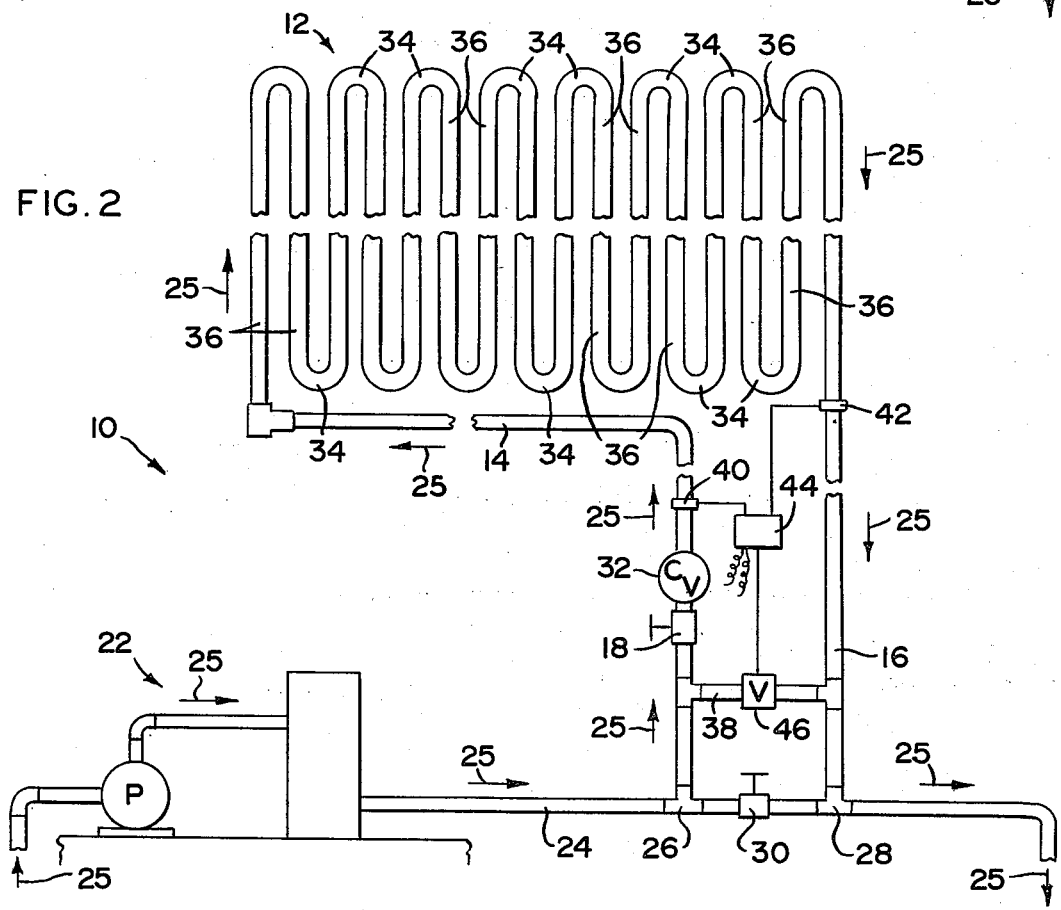
FIG. 2 is a schematic view of another embodiment including a temperature differential sensing means at least partially regulating fluid flow.

The manual system as depicted in FIG. 1 is operated in the following manner. When it is desired to heat the water within the swimming pool, first valve means 18 is opened and second valve means 30 is closed. Fluid flowing from pool pump/filter system 22 flows through conduit means 25 through inlet conduit means 14 through heat exchanger means 12 and out through outlet conduit means 16. Check valve means 32 prevents any possible reverse flow if second valve means 30 is left open. The fluid passing through heat exchanger means 12 is exposed to solar radiation, experiences an increase in temperature and passes on to the swimming pool. Since the system as described is manually operated, it is necessary to open first valve means 18 and close second valve means 30 when sufficient solar radiation is impinging upon heat exchanger means 12. Conversely, to cool the fluid in the swimming pool, first valve means 18 is closed and second valve means 30 is opened during periods of substantial solar radiation, and first valve means 18 is opened and second valve means 30 is closed during periods of darkness or little solar radiation.

The automatically controlled system as depicted in FIG. 2 is operated by opening first valve means 18 and closing second valve means 30. As in the manual system, this forces fluid to flow into inlet conduit means 14, heat exchanger means 12 and outlet conduit means 16. When temperature sensing means 40 and 42 indicate to temperature difference sensing means 44 that the temperature of the fluid in inlet fluid conduit means 14 is substantially equivalent to the temperature of the fluid in outlet conduit means 16, temperature differences sensing means 44 induces automatic valve means 46 to open. The fluid seeking the course of least heat resistance, will flow through cross conduit means 38 and into the pool, thus bypassing heat exchanger means 12. However, when temperature sensing means 40 and 42 indicate to temperature difference sensing means 44 that the temperature of the fluid in inlet conduit means 14 is substantially less than the temperature of the fluid in outlet conduit means 16, temperature difference sensing means 44 induces automatic valve means 46 to close. When automatic valve means 46 is closed the fluid is induced to flow into heat exchanger means 12 and then into the swimming pool. In the automatic configuration, the system functions whenever environmental conditions are such that the fluid would be warmed in the heat exchanger. In order to cool the fluid in the automatic configuration, temperature sensing means 40 and 42 are reversed such that temperature sensing means 42 is on inlet conduit means 14 and temperature sensing means 40 is on outlet conduit means 16.

While the description of the preferred embodiment is primarily directed to the use of the solar heater invention with a swimming pool pump/filter system, it is to be understood that the invention is intended for use in the environmental heating or cooling of any large body of fluid which is fitted with a suitable pump system.

It will thus be seen that the objects set forth above, among those made apparent from the preceding description, are efficiently attained, and, since certain changes may be made in the above construction without departing from the scope of the invention, it is intended that all matter contained in the above description or shown in the accompanying drawing shall be interpreted as illustrative and not in a limiting sense.

It is also to be understood that the following claims are intended to cover all the generic and specific features of the invention which, as a matter of language, might be said to fall therebetween.

Now that the invention has been described,

What is claimed is:

1. A swimming pool solar heater/cooler primarily designed for use with a swimming pool pump/filter system comprising heat exchanger means, inlet conduit means in fluid transmitting communication with said heat exchanger means, outlet conduit means in fluid transmitting communication with said heat exchanger means, first valve means in flow termination contact with said inlet conduit means, check valve means in said inlet conduit means, first T-connector means in fluid driving communication with the flow line of the pool pump/filter system and said inlet conduit means, second T-connector means in fluid dividing communication with the flow line of the pool pump/filter system and said outlet conduit means and located downstream from said first T-connector means, second valve means in flow terminating relation with the flow line from the pool pump/filter system and located substantially between said first T-connector and said second T-connector, said heat exchanger means further comprising substantially hollow linear tube means, substantially hollow, generally U-shaped tube means fluidly connecting said linear tube means to form coils of said heat exchanger means, said heat exchanger means further comprises substantially solar radiation resistant heat absorbing plastic tube means, temperature difference sensing means located in temperature sensing communication with said inlet and outlet conduit means, cross connect conduit means substantially in fluid communication between said inlet and outlet conduit means, automatic valve means located substantially in said cross connect conduit means and in responsive communication with said temperature difference sensing means.

2. A solar heater/cooler primarily designed for use with a swimming pool pump/filter system comprising heat exchanger means, inlet conduit means in fluid transmitting communication with said heat exchanger means, outlet conduit means in fluid transmitting communication with said heat exchanger means, first valve means in flow communicating contact with said inlet conduit means, check valve means in said inlet conduit means, first connector means in fluid dividing communication with a flow line of the pool pump/filter system and said inlet conduit means, second connector means in fluid dividing communication with the flow line of the pool pump/filter system and said outlet conduit means and located downstream from said first connector means, second valve means in flow terminating relation with the flow line from the pool pump/filter system and located between said first connector and said second connector, temperature difference sensing means located in temperature sensing communication with said inlet conduit means and said outlet conduit means, cross connect conduit means substantially in fluid communicating relation between said inlet and outlet conduit means, and automatic valve means located substantially in said cross connect means in electrical communication with said temperature difference sensing means, whereby the flow of water through said heat exchanger means may be regulated by said automatic valve means in response to said temperature difference sensing means.

3. A solar heater/cooler as in claim 2 wherein said heat exchanger means further comprises substantially hollow linear tube means, substantially hollow generally U-shaped tube means fluidly connecting said linear tube means.

4. A solar heater/cooler as in claim 2 wherein said heat exchanger means further comprises substantially solar radiation resistant, heat absorbing plastic tube means.

* * * * *